(12) United States Patent
Tachibana et al.

(10) Patent No.: US 8,723,508 B2
(45) Date of Patent: May 13, 2014

(54) METHOD FOR ANALYZING DC SUPERPOSITION CHARACTERISTICS OF INDUCTANCE DEVICE, AND ELECTROMAGNETIC FIELD SIMULATOR

(75) Inventors: Takeshi Tachibana, Tottori (JP); Satoru Tanaka, Tottori (JP); Keiko Kikuchi, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 630 days.

(21) Appl. No.: 13/121,488

(22) PCT Filed: Sep. 30, 2009

(86) PCT No.: PCT/JP2009/067073
§ 371 (c)(1),
(2), (4) Date: Mar. 29, 2011

(87) PCT Pub. No.: WO2010/038799
PCT Pub. Date: Apr. 8, 2010

(65) Prior Publication Data
US 2011/0181274 A1    Jul. 28, 2011

(30) Foreign Application Priority Data

Sep. 30, 2008 (JP) ................................. 2008-252294

(51) Int. Cl.
*G01B 7/14* (2006.01)
(52) U.S. Cl.
USPC ...................... 324/207.15; 336/170; 336/215
(58) Field of Classification Search
None
See application file for complete search history.

(56) References Cited

U.S. PATENT DOCUMENTS

| 6,960,911 B2 * | 11/2005 | Inoue ............................. 324/209 |
| 7,474,191 B2 * | 1/2009 | Ito et al. ........................ 336/200 |
| 7,659,791 B2 * | 2/2010 | Park et al. ........................ 333/1 |
| 2008/0038562 A1 | 2/2008 | Ito et al. |

FOREIGN PATENT DOCUMENTS

| JP | 05-099963 A | 4/1993 |
| JP | 2004-294123 A | 10/2004 |
| WO | 2008/018187 A1 | 2/2008 |

\* cited by examiner

*Primary Examiner* — Melissa Koval
*Assistant Examiner* — Trung Nguyen
(74) *Attorney, Agent, or Firm* — Sughrue Mion, PLLC (57) ABSTRACT

A method for analyzing the DC superposition characteristics of an inductance device using an electromagnetic field simulator, comprising a first step of determining an initial magnetization curve from initial magnetization to saturation magnetization, and pluralities of minor loops at different operating points, on a toroidal core made of the same magnetic material as that of the inductance device, and obtaining point-list data showing the relation between magnetic flux density or magnetic field strength and incremental permeability from the incremental permeability at each operating point; a second step of determining an operating point at a predetermined direct current on each element obtained by mesh-dividing an analysis model of the inductance device by an electromagnetic field simulator based on the initial magnetization curve of the core, allocating the incremental permeability to the operating point from the point-list data, and integrating the inductance of each element obtained from the incremental permeability to determine the inductance of the entire inductance device; and a third step of repeating the second step at different direct current levels to determine the DC superposition characteristics.

5 Claims, 6 Drawing Sheets

METHOD FOR ANALYZING DC SUPERPOSITION CHARACTERISTICS OF INDUCTANCE DEVICE, AND ELECTROMAGNETIC FIELD SIMULATOR

CROSS REFERENCE TO RELATED APPLICATIONS

This application is a National Stage of International Application No. PCT/JP2009/067073 filed on Sep. 30, 2009, which claims priority from Japanese Patent Application No. 2008-252294, filed on Sep. 30, 2008, the contents of all of which are incorporated herein by reference in their entirety.

FIELD OF THE INVENTION

The present invention relates to a method for analyzing the DC superposition characteristics of an inductance device used, for example, in DC-DC converters, etc., and an electromagnetic field simulator.

BACKGROUND OF THE INVENTION

The inductance device comprises a core made of a magnetic material, and a coil for supplying exciting current to the core, the excited core being operated non-linearly along a magnetic hysteresis curve called B-H curve or magnetization curve. The numerical analysis of an electromagnetic field using computers is widely used in the development and designing of inductance devices. However, as devices such as DC-DC converters, etc. have become operated with large current recently, their magnetic circuits have become complicated, for instance, with a large number of magnetic gaps in magnetic paths to alleviate the magnetic saturation of cores. As a result, there is now large discrepancy between the analyzed values and the measured values.

As a method for such numerical analysis, JP 05-099963 A discloses an apparatus for calculating the inductance of a magnetic member excited by alternate current superimposed with direct current, which comprises a first calculation means for calculating a magnetic flux density of the magnetic member for a direct current component, based on the initial magnetization of a magnetic body made of the same material as that of the magnetic member and having a shape of the minimum demagnetization coefficient; a means for determining a material constant from the magnetic flux density calculated by the hfirst calculation means and the incremental permeability of the magnetic material; a second calculation means for calculating a magnetic flux density of the magnetic member for an alternate current component using the material constant; and a means for calculating the inductance of the magnetic member based on the magnetic flux density calculated by the second calculation means. The incremental permeability is calculated from inductance determined by the evaluation of DC superposition characteristics using a ring-shaped sample, the magnetic path length and cross section area of the sample, and the number of coil winding, etc. The magnetic flux density and the incremental permeability are determined from the magnetic field strength of the sample for a superimposed direct current component, and the initial magnetization.

In the inductance-calculating method described in JP 05-099963 A, because the material constant is determined by the evaluation of DC superposition characteristics using the ring-shaped sample, the inductance can be calculated with high accuracy without the trial production of magnetic parts. However, this method is complicated because it needs the evaluation of DC superposition characteristics, and minor loops by alternate current are not considered in obtaining the operating point (magnetic field strength and magnetic flux density) from the DC superposition characteristics and the initial magnetization. Therefore, there is room for further improvement in the accuracy of numerical analysis.

The magnetic properties of inductance devices may change depending on use temperatures, stress, direct current, etc., but JP 05-099963 A does not take such change into consideration. Without considering these factors, the analysis of the magnetic properties of inductance devices is insufficient.

OBJECT OF THE INVENTION

Accordingly, an object of the present invention is to provide a method for analyzing the DC superposition characteristics of an inductance device using an electromagnetic field simulator more easily with higher accuracy than conventional methods, with use environment taken into consideration, and an electromagnetic field simulator used therein.

DISCLOSURE OF THE INVENTION

The method of the present invention for analyzing the DC superposition characteristics of an inductance device using an electromagnetic field simulator, comprises a first step of determining an initial magnetization curve from initial magnetization to saturation magnetization, and pluralities of minor loops at different operating points on the initial magnetization curve, on a toroidal core made of the same magnetic material as that of the inductance device, and using each operating point and incremental permeability defined as the gradient of each minor loop at each operating point, to obtain point-list data showing the relation between magnetic flux density or magnetic field strength and the incremental permeability;

a second step of determining an operating point at a predetermined direct current on each element obtained by mesh-dividing an analysis model of the inductance device by an electromagnetic field simulator based on the initial magnetization curve of the toroidal core, allocating the incremental permeability to the operating point from the point-list data, and integrating the inductance of each element obtained from the incremental permeability to determine the inductance of the entire inductance device; and a third step of repeating the second step at different direct current levels to determine the DC superposition characteristics.

When the magnetic body (core) is magnetized in advance, the DC superposition characteristics of the magnetized body can be analyzed.

When the point-list data are obtained on the magnetic body under stress in the first step, based on the stress analysis results obtained in advance on the analysis model, and when the point-list data depending on a stress state of each element are used in the second step, the DC superposition characteristics of the magnetic body can be analyzed with high accuracy even when uneven stress is applied to the magnetic body.

When the point-list data are obtained at predetermined temperatures in the first step, based on the thermal analysis results obtained in advance on the analysis model, and when the point-list data depending on a temperature state of each element are used in the second step, the DC superposition characteristics of the magnetic body can be analyzed with high accuracy even when the magnetic body is subject to an uneven temperature due to heat generated by eddy current loss, etc.

The electromagnetic field simulator of the present invention for analyzing the DC superposition characteristics of an inductance device comprising a means for storing the data of an initial magnetization curve from initial magnetization to saturation magnetization obtained on a toroidal core made of the same magnetic material as that of the inductance device, and point-list data showing the relation between magnetic flux density or magnetic field strength and incremental permeability which are obtained on pluralities of minor loops at different operating points on the initial magnetization curve;

a means for inputting an analysis model of the inductance device; and a calculation means for determining an operating point at a predetermined direct current on each mesh-divided element of the analysis model based on the initial magnetization curve of the toroidal core, allocating the incremental permeability to the operating point from the point-list data, and integrating the inductance of each element determined from the incremental permeability to determine the inductance of the inductance device.

DESCRIPTION OF THE BEST MODE OF THE INVENTION

In the method of the present invention for analyzing the DC superposition characteristics of an inductance device, the analysis of operating points by direct current uses a magnetization curve from initial magnetization to initial saturation magnetization, and the analysis of the change of a magnetic flux density from operating points by alternate current uses the gradients (incremental permeability) of minor loops. Thus, the analysis method of the present invention takes the characteristics of the above two magnetization curves into consideration. The method of the present invention for analyzing the DC superposition characteristics of an inductance device comprises the following three steps.

[1] First Step

In the first step, a major loop of an initial magnetization curve from initial magnetization to saturation magnetization of a toroidal core made of the same magnetic material as that of the inductance device, and pluralities of minor loops at different operating points on the initial magnetization curve are measured. The measurement of their dependency on stress and temperature makes it possible to analyze the DC superposition characteristics of an inductance device depending on a stress distribution in the inductance device, and an ambient temperature or heat generation.

Figure 1:
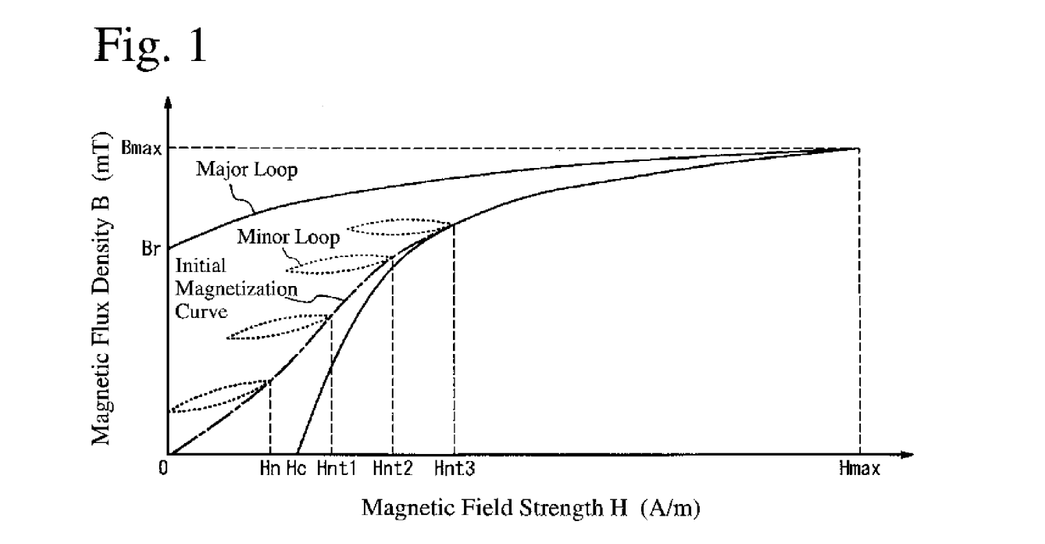
FIG. 1 is a graph showing a magnetization curve for explaining the analysis method of the present invention.

Referring to FIG. 1, the measurement methods of an initial magnetization curve and a minor loop will be explained by specific examples below, without intention of restricting the present invention thereto. A toroidal core of 30 mm in outer diameter, 20 mm in inner diameter and 7.5 mm in thickness made of a magnetic material in a demagnetized state is provided with a primary winding and a secondary winding each having 80 turns. The number of windings may be properly increased or decreased depending on the permeability and size of the toroidal core. The primary winding is connected to a power supply via a resistor. Voltage between both ends of the resistor is shown on the axis of abscissas of a digital oscilloscope, and the output of the secondary winding is shown on the axis of ordinates of a digital oscilloscope.

The power supply voltage (proportional to magnetic field) of a B-H analyzer is gradually increased from initial magnetization to a saturation magnetic flux density (Bmax), gradually returned to zero, increased to the saturation magnetic flux density again with the polarity reversed, and finally gradually returned to zero, to obtain the initial magnetization curve (major loop). FIG. 1 shows a major loop in the first quadrant.

Figure 2:
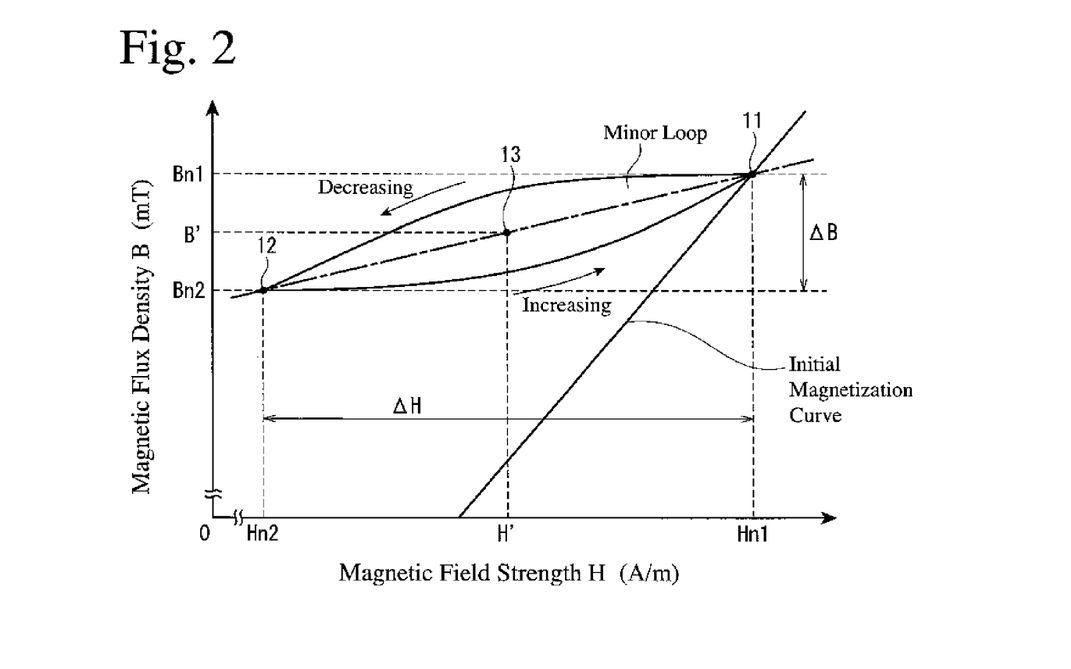
FIG. 2 is a graph showing a minor loop for explaining the analysis method of the present invention.

As shown in FIG. 2, when the power supply voltage is decreased slightly at an intermediate point (for example, point 11) of the initial magnetization curve, current (proportional to the magnetic field strength H) decreases not along the initial magnetization curve but along an upper portion of a circular curve called minor loop to a point 12. When the power supply voltage increases again, current increases along a lower portion of the minor loop, and returns to the point 11 on the initial magnetization curve. Thus, the initial magnetization curve of the core, and pluralities of minor loops on the initial magnetization curve are measured. While obtaining an initial magnetization curve from initial magnetization to saturation magnetization, minor loops can be obtained at predetermined magnetic field strengths ($H_n$, $H_{n+1}$, $H_{n+2}$, ...). Also, using a core in a demagnetized state, the minor loop and the initial magnetization curve may be measured separately.

The above measurement conducted on magnetic bodies magnetized at predetermined magnetic field strengths provides the initial magnetization curves and minor loops of the core with different magnetization.

Figure 3:
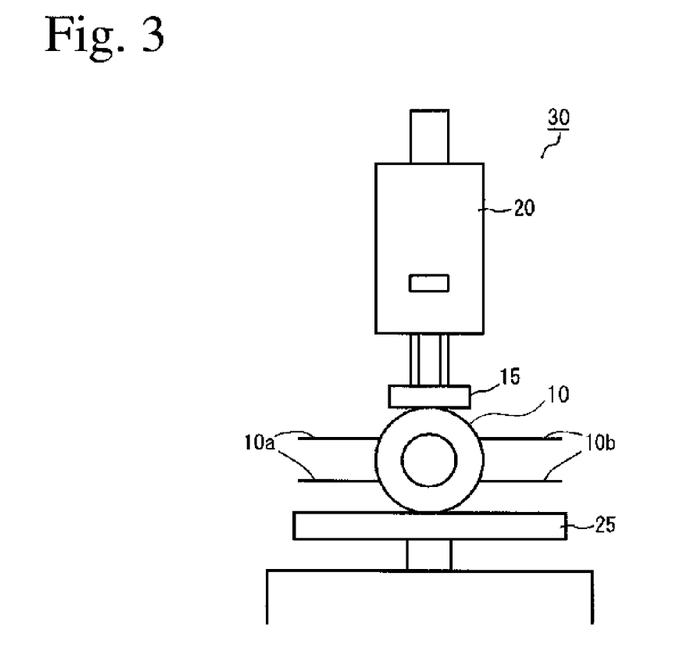
FIG. 3 is a schematic view showing an apparatus for measuring the magnetic properties of a toroidal core under stress.

Changing stress to the core, the dependency of the initial magnetization curve and the minor loop on stress can be obtained. FIG. 3 shows an apparatus for measuring the stress dependency. This apparatus comprises a table 25 on which a core 10 made of a magnetic material is placed, and a pressurizing jig 30 for applying stress to the core 10, and the pressurizing jig 30 comprises a tensiometer 20, and a plate member 15 fixed to a lower end thereof To apply uniform stress to the core 10, each of the table 25 and the plate member 15 may have a circular recess. The core 10 having a primary winding 10a and a secondary winding 10b connected to a power supply and an oscilloscope is place on the table 25, and subject to predetermined stress by the pressurizing jig 30 with the plate member 15 attached to a circumferential portion of the core 10, to obtain the initial magnetization curve and the minor loops.

The above measurement conducted at different ambient temperatures can determine the dependency of an initial magnetization curve and a minor loop on temperature. For example, the above measurement is conducted on a core kept at a temperature of +85° C. in a constant-temperature chamber.

The incremental permeability of the minor loop is expressed by the inclination ($\Delta B/\Delta H$) of a straight line connecting a magnetic-field-increasing point (point 12 on the left side in FIG. 2) and a magnetic-field-decreasing point (point 11 on the right side in FIG. 2). A middle point 13 in FIG. 2 is an operating point (B', H') of the minor loop. Incidentally, the curvature of the minor loop is exaggerated for explanation in FIG. 2, though it is actually close to a straight line.

When used in a DC-DC converter, usually alternate current of about 50-100 mA is supplied. The application of alternate current with a total amplitude $\Delta I$ (for example, high-frequency triangular wave) provides a minor loop for a magnetic field strength $\Delta H$, which corresponds to $\Delta I$ multiplied by the number N of windings of the coil. In the case of a triangular wave, for example, triangular-wave current superimposed on direct current flows through an inductance device during the operation of the DC-DC converter. Too large alternate current amplitude deforms the minor loop, deteriorating the linearity of the minor loop. In this case, a magnetic field applied need only be reduced.

In a magnetic body forming the inductance device, a magnetic flux density changes at a high switching frequency from a center at a magnetic flux density B' corresponding to the DC magnetic field strength H.

Using the linearity of the minor loop, incremental permeability $\Delta \mu$ at the operating point 13 (B', H') of the minor loop is determined from the inclination of a straight line connecting the magnetic-field-increasing point 12 and the magnetic-field-decreasing point 11, to obtain point-list data showing the relation between magnetic flux density or magnetic field strength and incremental permeability, enabling the simulation of the change of a magnetic flux density or a magnetic field strength from the operating point 13 by alternate current. Because the operating point (B', H') is a middle point of the minor loop, B', H' and incremental permeability $\Delta \mu$ are obtained from a magnetic field strength Hn1 and a magnetic flux density Bn1 at the magnetic-field-decreasing point 11, and a magnetic field strength Hn2 and a magnetic flux density Bn2 at the magnetic-field-increasing point 12 as follows:

$H' = (Hn1 + Hn2)/2$, $B' = (Bn1 + Bn2)/2$, and $\Delta \mu = \Delta B/\Delta H$.

The initial magnetization curve and the point-list data showing the relation between the magnetic flux density or the magnetic field strength and the incremental permeability, which are measured on a toroidal core made of the same magnetic material as that of the inductance device, are stored in a digital data table in a computer memory. The accuracy of simulation increases as the amount of data stored increases. The more the measurement points of temperature, stress, initial magnetization and magnetic field strength, the higher the calculation accuracy, but some of them may be determined by interpolation based on the initial magnetization curve and the point-list data showing the relation between the magnetic flux density or the magnetic field strength and the incremental permeability.

Thus, the first step produces the initial magnetization curve used for the analysis of a magnetic flux density by direct current, and the point-list data showing the relation between the magnetic flux density or the magnetic field strength and the incremental permeability, which are used for the analysis of the change of a magnetic flux density from the operating point by alternate current.

[2] Second Step

In the second step, inductance is calculated using an electromagnetic field simulator. In the present invention, transient response analysis is conducted using, for example, electromagnetic-field-analyzing software JMAG (registered trademark) available from The JRI Solutions, Ltd. for the electromagnetic field simulator. The explanation of individual functions of the electromagnetic field simulator will be omitted. The incremental permeability $\Delta \mu$ can be allocated from DLL file (dynamic link library file) converted from the point-list data of magnetic flux density and $\Delta \mu$, using a user subroutine magusr.f defining the magnetization properties of each element, which is attached to the electromagnetic field simulator.

The analysis is conducted by two stages. In the first stage, the operating point of each analysis element at direct current (Idc) is determined based on the initial magnetization curve obtained in the first step. In the second stage, magnetic flux change $\Delta \Phi$ from the initial value, which is analyzed in the first stage, is determined, with alternate current change $\Delta I$ of 30 mA determined using a restart function. The change of current may be at any level, unless the minor loop deviates from a linear approximation range. The magnetic flux change $\Delta \Phi$ is divided by the current change $\Delta I$ to calculate inductance. Influence by ambient temperatures, the heat generation of the coil, magnetization, etc. is preferably taken into consideration in determining the initial magnetization curve and the incremental permeability.

In the analysis of DC superposition characteristics at an ambient temperature of +85° C., for example, the point-list data showing the relation between magnetic flux density or magnetic field strength and incremental permeability, which are determined from the minor loop at +85° C., are used. When direct current is supplied to the coil continuously, the point-list data showing the relation between magnetic flux density or magnetic field strength and incremental permeability are used on each element, which is mapped by a temperature obtained by adding a temperature increment calculated from the amount of heat generated by the coil and the thermal capacity of the core to the ambient temperature.

In the analysis of DC superposition characteristics under stress, the point-list data showing the relation between magnetic flux density or magnetic field strength and incremental permeability, which are determined from the minor loop measured under a predetermined stress, are used. When the magnetic body is subject to an uneven stress, the point-list data showing the relation between magnetic flux density or magnetic field strength and incremental permeability are used on each element mapped by stress.

Allocating the incremental permeability (corresponding to the gradient of a minor loop) to the calculated operating point of each element, the change of a magnetic flux density from the operating point by alternate current is determined. Namely, using the point-list data of the magnetic flux density and the incremental permeability obtained in the first step, the incremental permeability $\Delta \mu$ is allocated to each element. Of course, software used for the calculation of DC superposition characteristics by this analysis procedure is not restricted to the above electromagnetic-field-analyzing software, but may be any other commercially available analysis software.

In the present invention, the point-list data are stored as space data, in which a magnetic flux density has a spatial distribution depending on the distance from the coil and magnetic saturation. In the space data, different magnetic flux densities are allocated to elements analyzed by a finite element method, unlike conventional models in which the entire core has one magnetic flux density.

When the magnetic field strength is used as the operating point, the point-list data of magnetic field strength and incremental permeability are used for a magnetic field strength H in each element to be analyzed, allocating the incremental permeability $\Delta\mu$ to each analysis element.

Because the magnetic field strength is in a one-to-one relation with the magnetic flux density at an operating point, any one of them may be used as a parameter in relation with the incremental permeability $\Delta\mu$, but the magnetic flux density is a more preferable parameter for finally determining inductance.

[3] Third Step

Repeating the second step with direct current Idc (magnetic field strength) changed, the DC superposition characteristics of the inductance device can be determined with high accuracy at high speed. All calculation is conducted by a computer.

Although a finite element method is preferably used for the analysis of DC superposition characteristics, it is of course not restrictive, but an integration method (magnetic moment method), a boundary element method, etc. may also be used. In the finite element method, a detailed core shape can be input, the dependency of material properties on a magnetic field can be taken into consideration, and the detailed distributions of a magnetic field, current, an electromagnetic force and loss can be determined with high accuracy. The finite element method software is commercially available for personal computers (PCs), with abundant analysis cases.

The present invention will be explained in detail referring to Examples below without intention of restriction.

EXAMPLE 1

Figure 4:
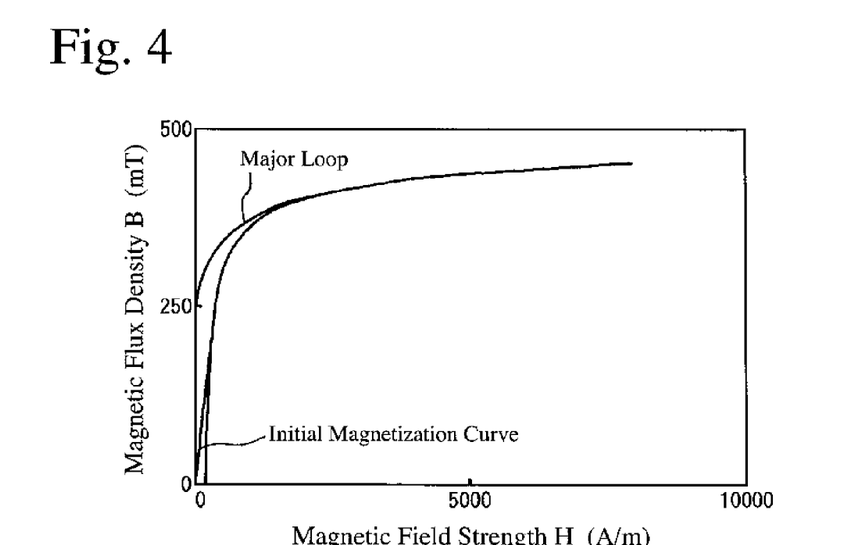
FIG. 4 is a graph showing the magnetization curve of a toroidal core used in the analysis method of the present invention.

A toroidal ferrite core of 30 mm in outer diameter, 20 mm in inner diameter and 7.5 mm in thickness was provided with a primary winding and a secondary winding each having 80 turns, to measure an initial magnetization curve and minor loops. FIG. 4 shows an initial magnetization curve and a major loop in the first quadrant. The minor loop was obtained with a magnetic field strength increasing by 100 A/m step, with $\Delta H$ of 20 A/m. A measurement interval of magnetic field strength need not be constant, but may be narrow in a region with large $\Delta B$ change, and wide in a region with small $\Delta B$ change. Initial magnetization properties are determined from the initial magnetization curve, and the point-list data of magnetic flux density and incremental permeability are determined from the minor loops.

Figure 5:
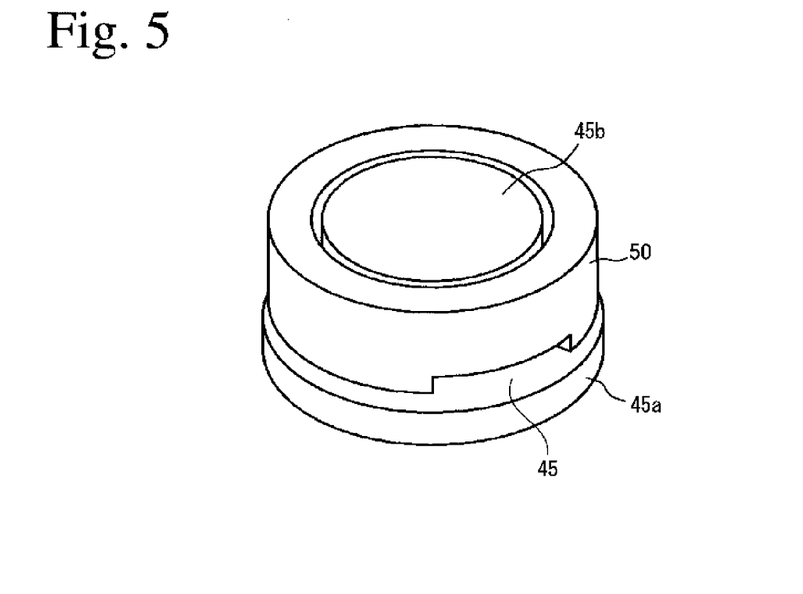
FIG. 5 is one example of analysis models of inductance devices used in the analysis method of the present invention.

FIG. 5 shows one example of analysis models used in the method of the present invention for analyzing the DC superposition characteristics of an inductance device. This model is a sleeved, drum-shaped winding inductor having an outer size of 3.0 mm in diameter and 1.2 mm in height, which comprises a first core 45 having a flange 45a and a center projection 45b, and a second core (sleeve) 50 covering a side surface of the center projection 45b. The center projection 45b and the sleeve 50 are arranged with a predetermined gap, and a coil (not shown) of 9.5 turns is wound around the center projection 45b.

Figure 6:
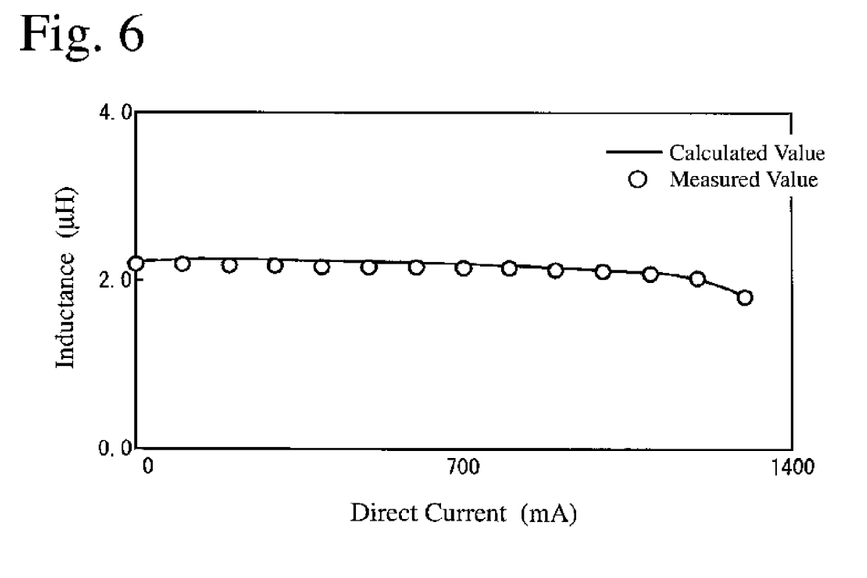
FIG. 6 is a graph showing the values of DC superposition characteristics analyzed by the method of the present invention and the measured values.

Using the resultant initial magnetization properties, and the point-list data of magnetic flux density and incremental permeability, the inductance of the sleeved, drum-shaped winding inductor was calculated according to the second step method by an electromagnetic field simulator. Also, the inductance of the sleeved, drum-shaped winding inductor was measured at 25° C. FIG. 6 shows the relation between the direct current Idc applied and the inductance L. White circles represent the measured values along the L-Idc curve (analyzed values). It is clear from FIG. 6 that the analyzed values are in good agreement with the measured values.

EXAMPLE 2

Figure 7:
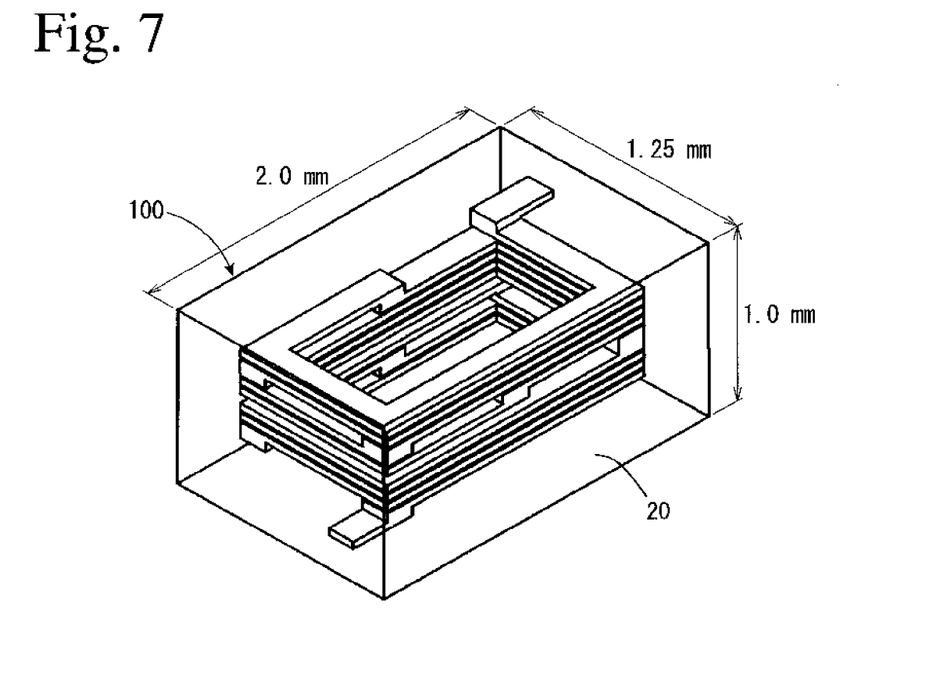
FIG. 7 is a perspective view showing another example of analysis models of inductance devices used in the analysis method of the present invention.
Figure 8:
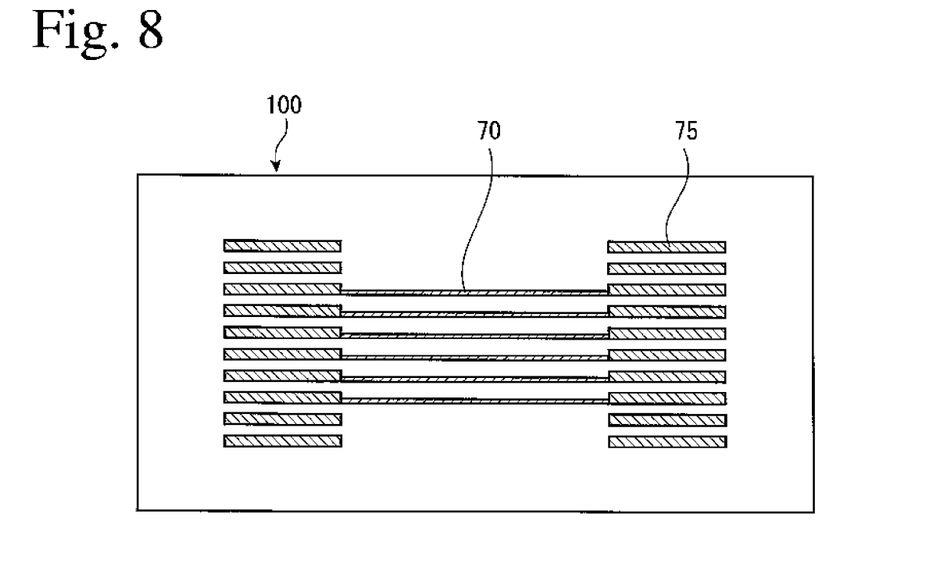
FIG. 8 is a vertical cross-sectional view showing the analysis model of FIG. 7.

FIG. 7 shows another example of analysis models of inductance devices used in the method of the present invention for analyzing the DC superposition characteristics, which is a laminate inductor 100 of 2.0 mm in length, 1.25 mm in width and 1.0 mm in height having magnetic gaps. FIG. 8 is a vertical cross-sectional view showing the internal structure of the laminate inductor 100. The laminate inductor 100 is produced by laminating pluralities of ferrite sheets printed with a silver paste for forming coil patterns 75, and integrally sintering them. Accordingly, thermal stress is generated in interfaces between the silver layers and the ferrite sheets due to thermal expansion coefficient difference. The magnetic properties (initial magnetization curve, incremental permeability, etc.) of ferrite are easily influenced by stress.

The magnetic gaps 70 inside the coil patterns 75 are formed by printing the ferrite sheets with a paste of $ZrO_2$ powder. End portions of the magnetic gaps 70 are in contact with or partially overlap the coil patterns 75. Changing the number of the magnetic gaps 70, the initial inductance can be changed.

Figure 9:
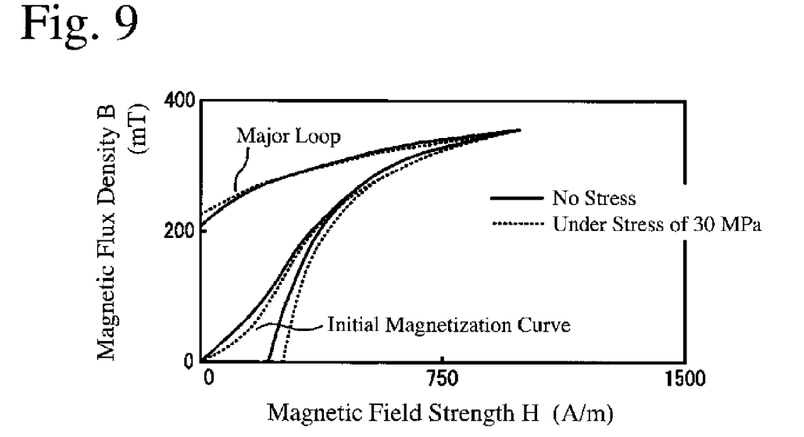
FIG. 9 is a graph showing initial magnetization curves obtained with and without stress by the method of the present invention.
Figure 10:
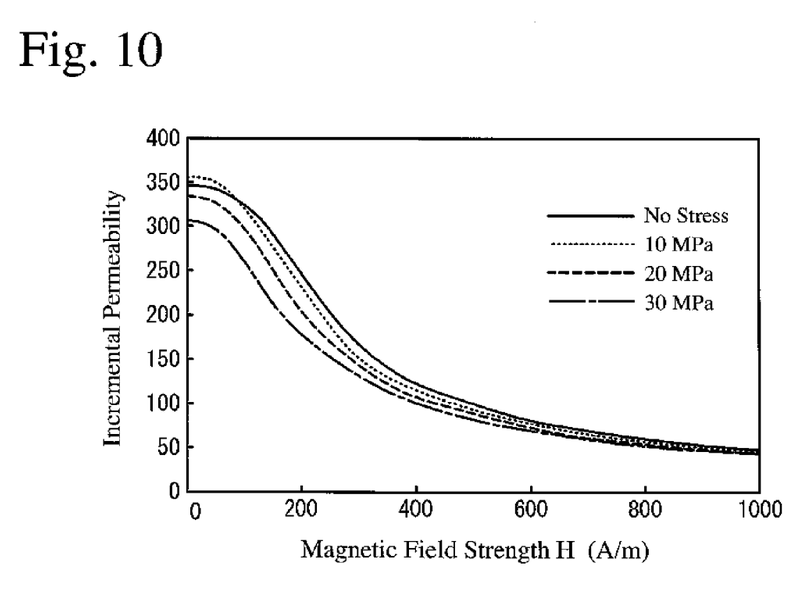
FIG. 10 is a graph showing the relation between magnetic field strength and incremental permeability obtained with and without stress by the method of the present invention.

Stress of 10 MPa, 20 MPa and 30 MPa, respectively, was applied by the apparatus shown in FIG. 3 to a rectangular, toroidal ferrite core having an outer size of 8 mm×8 mm, an inner size of 4 mm×4 mm and a thickness of 2 mm in parallel to its magnetic path, to obtain its initial magnetization curve and incremental permeability. FIG. 9 shows initial magnetization curves with and without stress of 30 MPa. FIG. 10 shows incremental permeabilities with and without stress. Because increase in stress changes the initial magnetization curve and the minor loop, the incremental permeability and the operating point also change.

Figure 11:
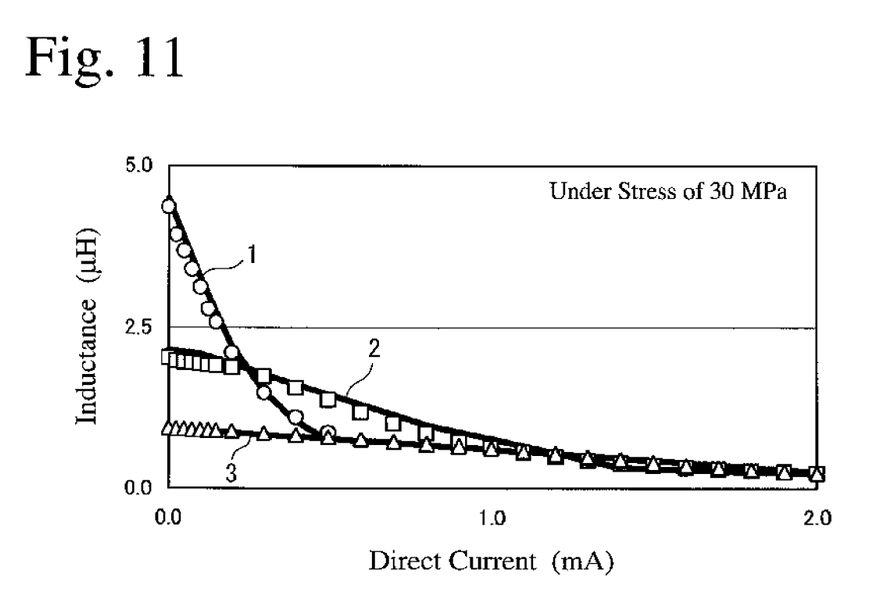
FIG. 11 is a graph showing the values of DC superposition characteristics analyzed by the method of the present invention and the measured values both under stress.

Because a stress distribution in the laminate inductor varies depending on the occupancy ratio of silver (% by volume) in the laminate inductor and the shape of coil-forming conductor patterns, the stress distribution is calculated by a finite element method for magnetic field analysis. The analysis of DC superposition characteristics was conducted by an electromagnetic field simulator in both cases with and without stress of 30 MPa. FIG. 11 shows the relation between the direct current Idc applied and the inductance L, together with the inductance L of the laminate inductor measured at 25° C. A solid line 1 indicates the analyzed values of a laminate inductor with a coil of 10.5 turns and a 3.5-μm-thick magnetic gap layer, and white circles indicate the measured values. A solid line 2 indicates the analyzed values of a laminate inductor with a coil of 9.5 turns and three 8-μm-thick magnetic gap layers, and white squares indicate the measured values. A solid line 3 indicates the analyzed values of a laminate inductor with a coil of 5.5 turns and six 3.5-μm-thick magnetic gap layers, and white triangles indicate the measured values. It is clear from FIG. 11 that the analyzed values are in good agreement with the measured values.

Effect of the Invention

The DC superposition characteristics of an inductance device can be analyzed more easily with higher accuracy by the method of the present invention analyzing by an electromagnetic field simulator using incremental permeability values determined from pluralities of minor loops at different operating points on an initial magnetization curve, than by conventional methods. Also, influence by temperature and stress can be taken into consideration in the analysis. Accordingly, the trial production and evaluation steps of inductance devices needing much time and cost can be reduced, making it less expensive to design them.

What is claimed is:

1. A method for analyzing the DC superposition characteristics of an inductance device using an electromagnetic field simulator, comprising
    a first step of determining an initial magnetization curve from initial magnetization to saturation magnetization, and pluralities of minor loops at different operating points on said initial magnetization curve, on a toroidal core made of the same magnetic material as that of said inductance device, and using each operating point and incremental permeability defined as the gradient of each minor loop at each operating point, to obtain point-list data showing the relation between magnetic flux density or magnetic field strength and said incremental permeability;
    a second step of determining an operating point at a predetermined direct current on each element obtained by mesh-dividing an analysis model of said inductance device by an electromagnetic field simulator based on the initial magnetization curve of said toroidal core, allocating the incremental permeability to said operating point from said point-list data, and integrating the inductance of each element obtained from said incremental permeability to determine the inductance of the entire inductance device; and
    a third step of repeating the second step at different direct current levels to determine said DC superposition characteristics.

2. The method for analyzing the DC superposition characteristics of an inductance device according to claim 1, wherein said toroidal core is magnetized in advance to determine the DC superposition characteristics of the magnetized inductance device.

3. The method for analyzing the DC superposition characteristics of an inductance device according to claim 1, wherein the point-list data are obtained in the first step on said toroidal core under stress based on the stress analysis results obtained in advance on said analysis model, and the point-list data depending on a stress state of each element of said analysis model are used in the second step.

4. The method for analyzing the DC superposition characteristics of an inductance device according to claim 1, wherein the point-list data of said toroidal core at a predetermined temperature are obtained in the first step based on the thermal analysis results obtained in advance on said analysis model, and the point-list data depending on a temperature state of each element of said analysis model are used in the second step.

5. An electromagnetic field simulator for analyzing the DC superposition characteristics of an inductance device, comprising
    a means for storing the data of an initial magnetization curve from initial magnetization to saturation magnetization obtained on a toroidal core made of the same magnetic material as that of said inductance device, and point-list data showing the relation between magnetic flux density or magnetic field strength and incremental permeability which are obtained on pluralities of minor loops at different operating points on said initial magnetization curve;
    a means for inputting an analysis model of said inductance device; and
    a calculation means for determining an operating point at a predetermined direct current on each mesh-divided element of said analysis model based on the initial magnetization curve of said toroidal core, allocating the incremental permeability to said operating point from said point-list data, and integrating the inductance of each element determined from said incremental permeability to determine the inductance of said inductance device.

* * * * *